United States Patent [19]

Chuan

[11] Patent Number: 5,451,102
[45] Date of Patent: Sep. 19, 1995

[54] CABINET WITH CONNECTING MECHANISM FOR TWO ADJACENT WALL PLATE

[76] Inventor: Yuan-Jung Chuan, 38-27, Tzu-Way Hou, Hou-Pi Shiang, Tainan Shien, Taiwan

[21] Appl. No.: 181,209

[22] Filed: Jan. 13, 1994

[51] Int. Cl.6 .................................... A47B 47/04
[52] U.S. Cl. ................... 312/263; 312/257.1; 312/265.5; 463/406.1; 463/407.1; 463/231; 52/272
[58] Field of Search ........... 312/263, 257.1, 265.5, 312/266.6; 411/366, 182, 546; 403/406.1, 407.1; 52/272, 285.1, 285.2

[56] References Cited

U.S. PATENT DOCUMENTS

| | | | |
|---|---|---|---|
| 99,460 | 1/1870 | Mullane et al. | 403/407.1 |
| 1,108,209 | 8/1914 | Mitchell et al. | 411/546 X |
| 2,980,972 | 4/1961 | Kloote et al. | 52/272 |
| 3,403,641 | 10/1968 | Baker | 312/263 X |
| 3,438,164 | 4/1969 | Duepree | 312/263 X |
| 3,680,899 | 8/1972 | Newcomer | 312/263 |
| 3,717,396 | 2/1973 | Dupree | 312/265.5 |
| 3,874,133 | 4/1975 | Silvius | 403/407.1 |
| 4,105,348 | 8/1978 | Anderson et al. | 312/257.1 X |
| 4,650,263 | 3/1987 | Monaghan et al. | 312/263 X |

*Primary Examiner*—Kenneth J. Dorner
*Assistant Examiner*—Rodney B. White

[57] ABSTRACT

A cabinet with connecting mechanism generally comprises a horizontal wall plate, a vertical wall plate, a retaining block, a connecting plug, a bolt member and a lid. In assembling, the horizontal wall plate and the vertical wall plates can be attached together by the engagement of the retaining block and the bolt member. Hence the assembling and disassembling of the cabinet can be easily done. A large space is benefited in transportation and storage.

1 Claim, 6 Drawing Sheets

CABINET WITH CONNECTING MECHANISM FOR TWO ADJACENT WALL PLATE

BACKGROUND OF THE INVENTION

This invention relates to a display cabinet, more particularly, to a display cabinet with connecting mechanism for two adjacent wall plate.

The convention display cabinet, as shown in FIG. 1, an exploded perspective view, and FIG. 2, an assembled perspective view, is assembled from individual plate. Most of the plate 1 used to assembled the cabinet is made from plastic material. In assembling the display cabinet, the plastic plate 1 is cut firstly into predetermined size. Then the plate 1 is further is cut with a V-shape cutout 10 at suitable position. Finally, an adhesive is applied to the cutout 10 of the plate 1 and a display cabinet is assembled.

Since the cabinet is assembled from a plurality of separate plates 1 which are attached together by applying the adhesive to the cutout 10, each of cabinet has a predetermined size which may not meet the requirements of the customer. Besides, the assembled cabinet has a very large volume which is not suitable for transportation as well as in storage.

SUMMARY OF THE INVENTION

It is the object of this invention to provide a cabinet with connecting mechanism for two adjacent plate for facilitating an easily assembling and disassembling of the cabinet.

In order to achieve the object set forth, the cabinet with connecting mechanism for two adjacent plate comprises a horizontal wall plate. Each of the wall plate has a hollowed center portion which is partitioned by a plurality of vertical walls to form a plurality of chambers. Each of the chambers is provided with a retaining hole at the upper surface. A retaining block having a flexible rachet at the upper surface. The retaining block can be received and retained by the chamber through the engagement of the rachet and retaining bole. The retaining block further includes a vertical slot for receiving a nut thereof. A horizontal hole is disposed at the front surface of the retaining block. The horizontal hole is interconnected with the vertical slot of the retaining block. A vertical wall plate has the same configuration of the horizontal wall plate. The vertical wall plate has a small hole at the inner surface and a larger hole at the outer surface. A connecting plug defines a tubular configuration. The connecting plug has a projecting tube portion to be received by the small hole. The connecting plug further includes a collapsible fence portion opposite to the projecting tube portion. A shoulder portion is provided at the upper portion of the fence portion. The connecting plug has a through hole in the center portion. A bolt member can be received by the through hole of the connecting plug and then retained by the nut disposed within the vertical slot of the retaining block. A lid member is inserted into the center of the circular fence and press the shoulder of the fence against the inner rim of the larger hole.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of a display cabinet with connecting mechanism for two adjacent wall plate. In the drawings.

DETAILED DESCRIPTION OF THE PREFERABLE EMBODIMENTS

Figure 1:
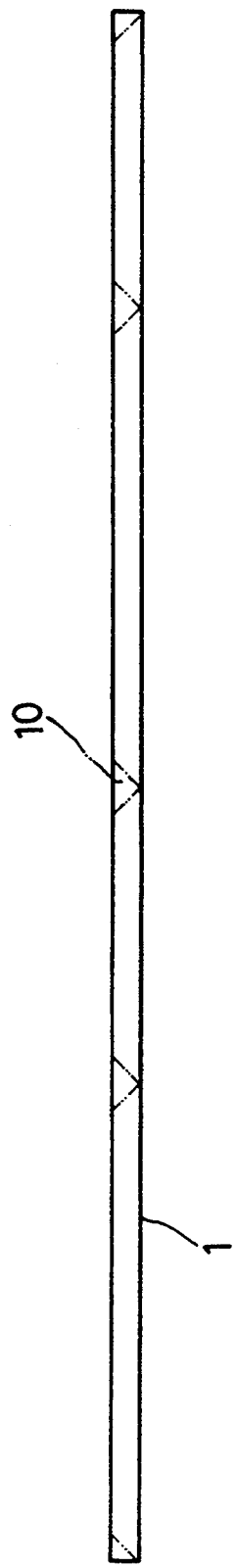
FIG. 1 is an exploded perspective view of a convention display cabinet.
Figure 2:
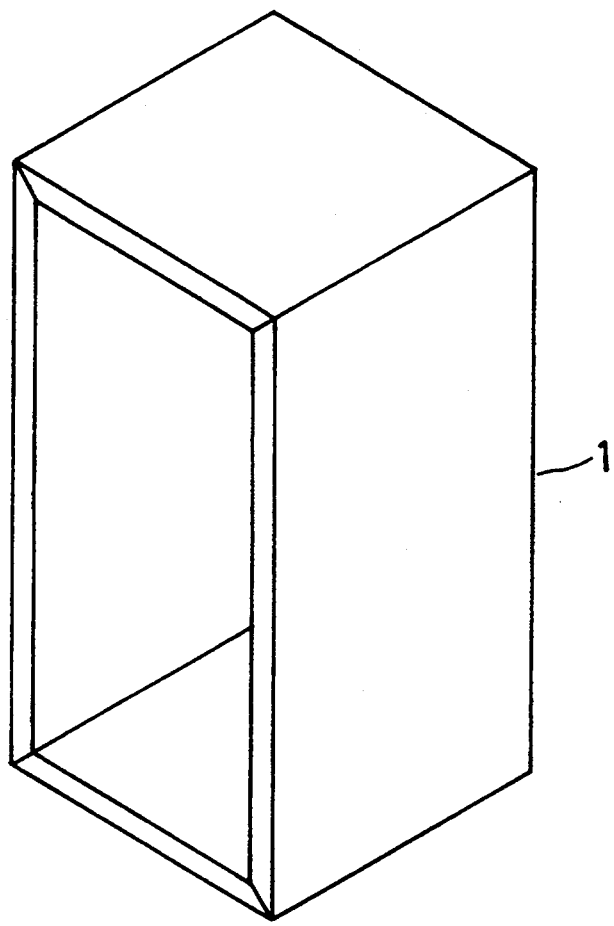
FIG. 2 is an assembled perspective view of a convention display cabinet.
Figure 3:
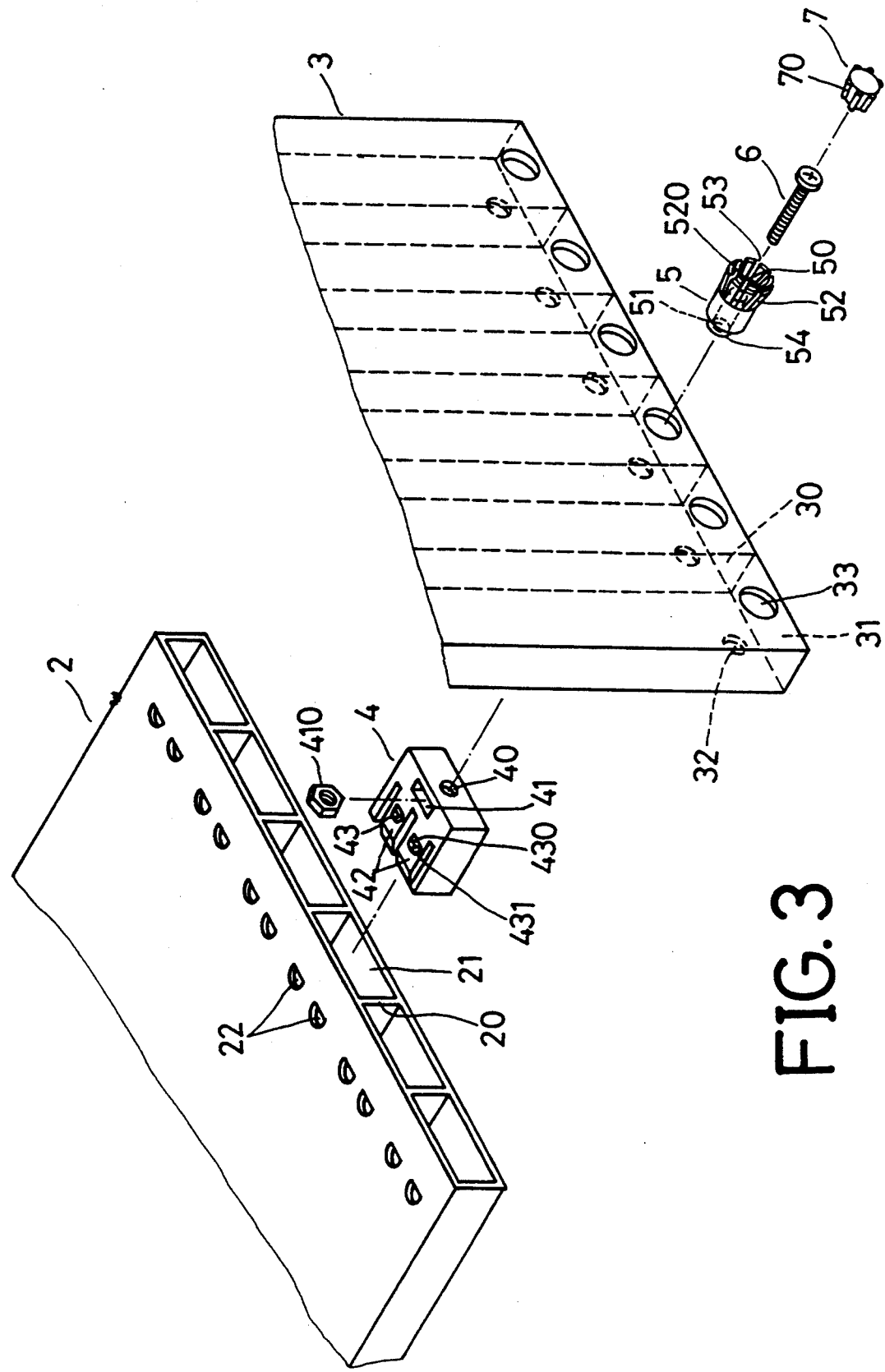
FIG. 3 is an exploded perspective view of a display cabinet made according to this invention.
Figure 4:
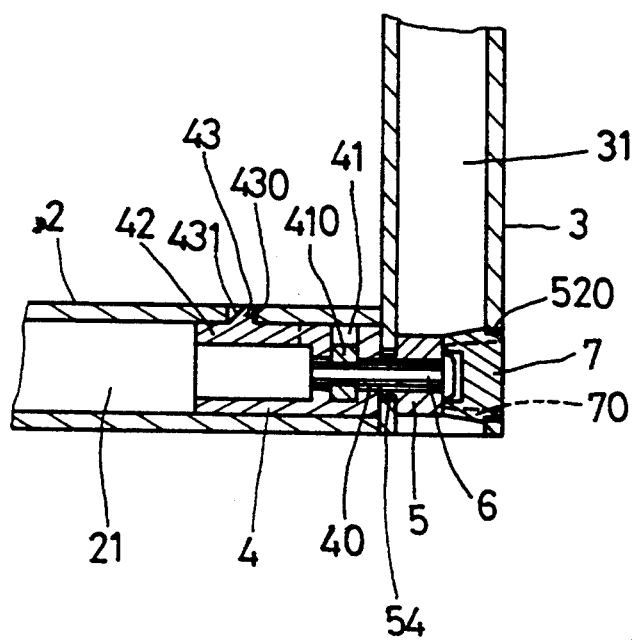
FIG. 4 is a cross section of the display cabinet showing the arrangement of the connecting mechanism and the wall plates.
Figure 5:
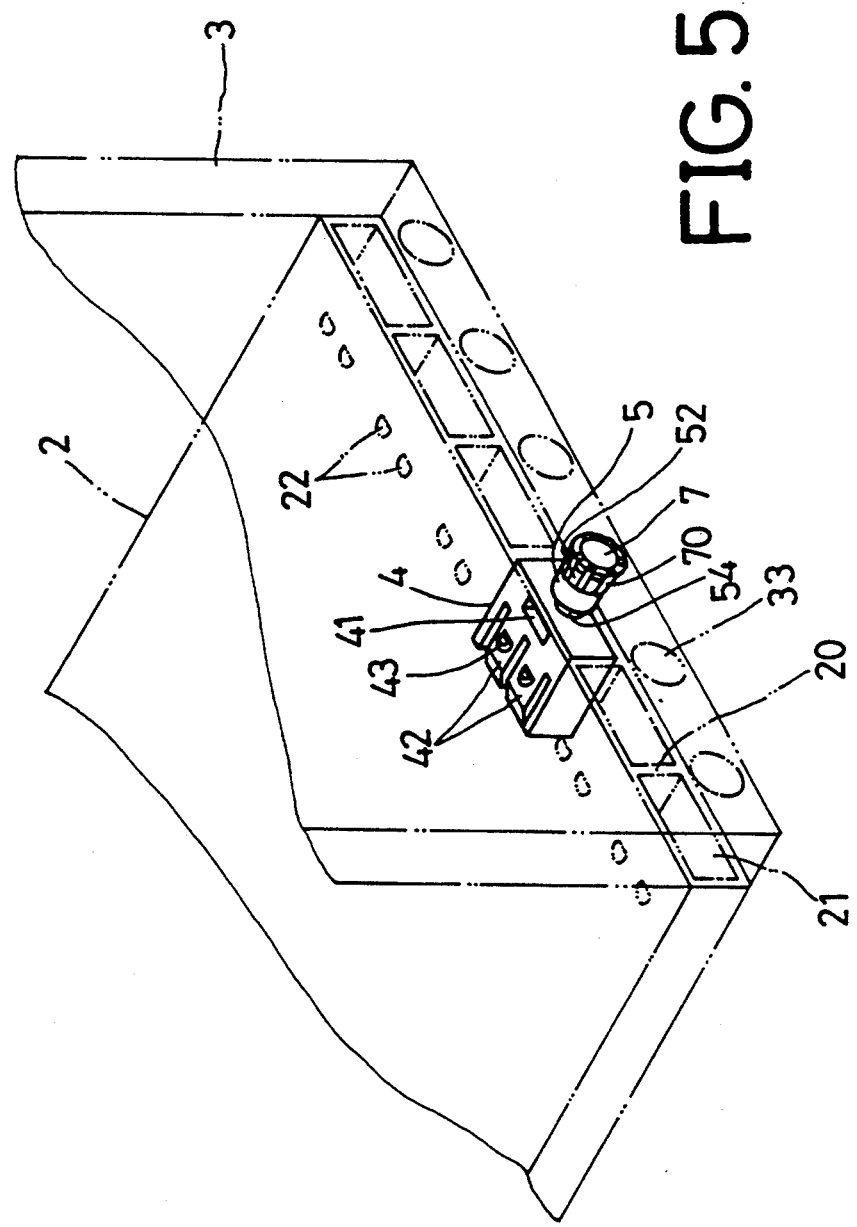
FIG. 5 is a sketched view of a display cabinet showing the positioning of the connecting mechanism.
Figure 6:
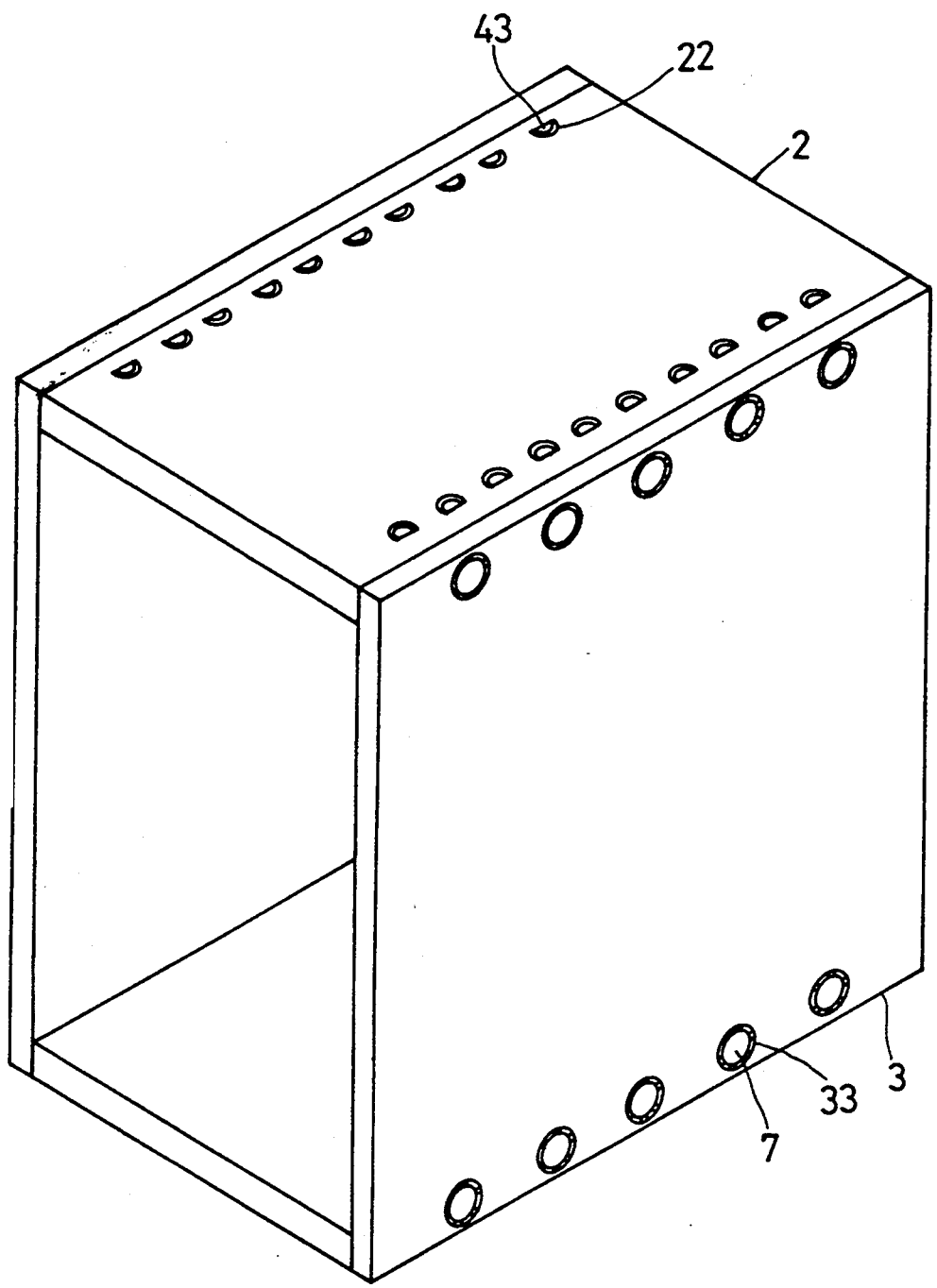
FIG. 6 is an assembled perspective view of a display made according to this invention.

Referring to FIG. 3, the cabinet with connecting mechanism generally comprises a horizontal wall plate 2, a vertical wall plate 3, a retaining block 4, a connecting plug 5, a bolt member 6 and a lid 7. Each of the horizontal wall plate 2 has a hollowed center portion which is partitioned by a plurality of vertical walls 20 to form a plurality of chambers 21. Each of the chambers 21 is provided with a retaining hole 22 at the upper surface.

A retaining block 4 having a rachet 43 which are disposed at a flexible plate 42 at the upper surface. The rachet 43 has an inclined surface 431 and a vertical surface 430 thereof. The retaining block 4 can be received and retained by the chamber 21 through the engagement of the rachet 43 and retaining boles 22. The retaining block 4 further includes a vertical slot 41 for receiving a nut 410 thereof. A horizontal hole 40 is disposed at the front surface of the retaining block 4. The horizontal hole 40 is interconnected with the vertical slot 41 of the retaining block 4. A nut 410 is disposed within the vertical slot 41.

A vertical wall plate 3 has the same configuration of the horizontal wall plate 2. The vertical wall plate 3 is partitioned by a plurality of vertical wall 30 to form a plurality of chambers 31 in the center portion. The vertical wall plate 3 has a small hole 32 at the inner surface and a larger hole 33 at the outer surface.

A connecting plug 5 defines a tubular configuration thereof. The connecting plug 5 has a projecting tube portion 54 to be received by the small hole 32. The tube portion 54 further includes a recessed portion 50. The connecting plug 5 further includes a collapsible fence portion 52 opposite to the projecting tube portion 54. A should portion 520 is provided at the upper portion of the fence portion 52. The connecting plug 5 has a through hole 51 in the center portion.

A bolt member 6 can be received by the through hole 50 of the connecting plug 5 and then retained by the nut 410 disposed within the vertical slot 41 of the retaining block 4. A lid member 7 is inserted into the center of the circular fence 52 and press the shoulder 520 of the fence 52 against the inner rim of the larger hole 33. The lid 7 is provided with a vertical rib 70 at the circumference which can be received between the space 53 of the fence 52. By this arrangement, when the lid 7 is positioned and retained within the fence 52, the connecting plug 5 can be retained within the chamber 31 of the vertical wall plate 3.

In assembling, the retaining block 4 is firstly inserted into the chamber 21 such that an engagement between the rachet 43 and retaining hole 22 is achieved. The retaining block 4 can be easily inserted in be the help of the inclined surface 431 of the rachet 43. When the rachet 43 is received by the retaining hole 22, the vertical surface 430 will stop by the retaining hole 22 to prevent the retaining block 4 from being removed thereof. Meanwhile, the connecting plug 5 is inserted into the space between the small hole 32 and large hole 33 such that the tube portion 54 is received by the small hole 32 and the shoulder 520 of the fence 52 is located inside the larger hole 33. Then the bolt member 7 is firstly inserted into the through hole 50 of the connecting plug 5 and hole 40, finally, screwed into the nut 410 disposed in the vertical slot 41 of the retaining block 4. When the bolt member 6 is locked to a predetermined torque, the horizontal wall plate 2 and the vertical wall plate 3 is tightly connected from separating. Finally, the lid 7 is inserted into the space 50 of the fence 52 such that the shoulder 520 of the fence 52 is retained by the inner rim of the larger hole 33. Besides, the rib 70 of the connecting plug 7 is received between the space 53 of the fence 52. The bolt head of the bolt 6 is received by the recessed portion 50 of the By the provision of this invention, the size of the cabinet can be arranged by the customer. If the cabinet needs a stronger configuration, more connecting mechanism can be used to increase the engagement between the horizontal wall plate 2 and the vertical wall plate 3. When the cabinet need to be disassembled for transportation or storage, the lid 7 can be easily removed and the bolt member 6 can be screwed off to separate two connected wall plate.

The cabinet with a connecting mechanism can be concluded with the following advantages.

1. The assembling and disassembling can be easily done.
2. The size of the cabinet can be arranged according to the requirements of the customer.
3. A very small and compact size can be achieved when disassembled.
4. The connecting mechanism can be added to increase the strength and engagement of the cabinet.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claims.

I claim:

1. A cabinet with a connecting mechanism for two adjacent wall plates comprising:
   a horizontal wall plate having a hollowed center portion which is partitioned by a plurality of first vertical walls to form a plurality of first chambers therein, each of the first chambers being provided with a plurality of retaining holes through a first surface,
   a retaining block having a flexible rachet received and retained in one of the first chambers by engagement of the rachet and a retaining hole, said retaining block further including a slot for receiving a nut therein a horizontal hole being disposed through a front surface of said retaining block, and being interconnected with the slot;
   a vertical wall plate having inner and outer surfaces, and a hollowed center portion partitioned by a plurality of second vertical walls to form a plurality of second chambers, said vertical wall plate having a plurality of first, smaller holes through the inner surface and a plurality of second, larger holes through the outer surface in alignment with the first, smaller holes;
   a connecting plug defining a tubular configuration with a projecting tube portion to be received in the first, smaller hole of said vertical wall plate, said connecting plug further including a collapsible fence portion opposite to the projecting tube portion and a shoulder portion provided on the fence portion, said connecting plug having a through hole in a center portion;
   a bolt member received by said through hole of said connecting plug and then retained by a nut disposed in said slot of said retaining block; and
   a lid member inserted into the collapsible fence and pressing the shoulder portion of the fence against a rim of the second, larger hole.

* * * * *